(12) United States Patent
Mano et al.

(10) Patent No.: US 7,810,599 B2
(45) Date of Patent: Oct. 12, 2010

(54) RESERVE TANK LAYOUT STRUCTURE OF MOTORCYCLE

(75) Inventors: Yoshifumi Mano, Takarazuka (JP); Kenichi Jino, Kakogawa (JP); Atsuya Yoshida, Kakogawa (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 699 days.

(21) Appl. No.: 11/514,907

(22) Filed: Sep. 5, 2006

(65) Prior Publication Data

US 2007/0056791 A1 Mar. 15, 2007

(30) Foreign Application Priority Data

Sep. 9, 2005 (JP) .......................... P2005-262570

(51) Int. Cl.
*B62K 11/00* (2006.01)

(52) U.S. Cl. .................... 180/219; 180/229; 180/311

(58) Field of Classification Search ................. 180/219, 180/229, 311
See application file for complete search history.

(56) References Cited

U.S. PATENT DOCUMENTS

| | | | | |
|---|---|---|---|---|
| 4,531,928 A | * | 7/1985 | Ikenoya | 474/93 |
| 4,702,339 A | * | 10/1987 | Hayashi et al. | 180/219 |
| 4,706,617 A | * | 11/1987 | Asai et al. | 123/65 PE |
| 5,845,618 A | * | 12/1998 | Taue et al. | 123/317 |
| 6,845,836 B2 | * | 1/2005 | Inaoka et al. | 180/228 |
| 7,159,682 B2 | * | 1/2007 | Arnold | 180/229 |
| 2006/0040161 A1 | * | 2/2006 | Horii et al. | 429/34 |

FOREIGN PATENT DOCUMENTS

JP 61-157433 7/1986

* cited by examiner

*Primary Examiner*—Lesley Morris
*Assistant Examiner*—Maurice Williams
(74) *Attorney, Agent, or Firm*—Wenderoth, Lind & Ponack, L.L.P.

(57) ABSTRACT

A reserve tank layout structure of a motorcycle can secure a capacity of a reserve tank, and allow for easy checking of a remaining amount of a cooling water in the tank from the exterior. The layout structure is provided with a vehicle body frame, an engine supported by the vehicle body frame, a swing arm attached to the vehicle body frame so as to freely oscillate, a rear wheel supported by the swing arm, a wrapping transmission mechanism having an endless rope-like body wound between an output shaft of the engine and an axle of the rear wheel and transmitting power from the output shaft to the axle, and a reserve tank for storing cooling water of the engine, the reserve tank being disposed so that at least a part thereof is positioned at an inner peripheral side of the rope-like body.

19 Claims, 4 Drawing Sheets

RESERVE TANK LAYOUT STRUCTURE OF MOTORCYCLE

BACKGROUND OF THE INVENTION

1. Field of the Invention

The present invention relates to a reserve tank layout structure of a motorcycle.

2. Description of the Related Art

In Japanese Unexamined Patent Publication No. 61-157433, there is disclosed a motorcycle having an engine, a frame mounting the engine thereon, a front fork, a front wheel supported by a front portion of the frame via the front fork, and a rear wheel suspended by a rear portion of the frame. A radiator is arranged in a front side of the engine. A reserve tank is connected to the radiator via piping. The reserve tank is arranged near a meter within a front cowling of the motorcycle (related art 1).

Further, there has been conventionally known a motorcycle in which a reserve tank is arranged between a pair of right and left swing arms suspending a rear wheel of the motorcycle (related art 2).

In the related art 1 mentioned above, since the reserve tank is arranged near the radiator, there is an advantage that a pipe arrangement structure for connecting the radiator and the reserve tank can be simplified. However, since a space near the meter is narrow, it is hard to secure a capacity of the reserve tank. Further, a technique of the related art 2 can secure a layout space of the reserve tank wider than a technique of the related art 1. However, since the reserve tank gets into an inner side of the swing arm, it is hard to check out a remaining amount of a cooling water in the reserve tank from an external portion of the motorcycle.

SUMMARY OF THE INVENTION

The present invention addresses the above described condition, and an object of the present invention is to provide a reserve tank layout structure of a motorcycle which can secure a capacity of the reserve tank, and allow a remaining amount of a cooling water in the reserve tank to be easily checked from an external portion of the motorcycle.

In accordance with the present invention, there is provided a reserve tank layout structure of a motorcycle, including: a vehicle body frame; an engine supported by the vehicle body frame; a swing arm supporting a rear wheel and attached to the vehicle body frame so as to freely oscillate in a vertical direction; a wrapping transmission mechanism having an endless rope-like body wound between an output shaft of the engine and an axle of the rear wheel and transmitting power from the output shaft to the axle; and a reserve tank for storing engine cooling water, wherein the reserve tank is disposed so that at least a part thereof is positioned at an inner peripheral side of the endless rope-like body.

In accordance with this structure, since it is possible to increase a capacity of the reserve tank by utilizing a space in the inner peripheral side of the rope-like body of the wrapping transmission mechanism, and it is possible to arrange the reserve tank in a side portion of the motorcycle provided with the wrapping transmission mechanism, it is possible to easily check out a remaining amount of the cooling water within the reserve tank from an external portion.

Preferably, the reserve tank may be attached to the vehicle body frame.

In accordance with this structure, since it is possible to make the relative position of a radiator for the engine normally supported on the vehicle body frame and the reserve tank constant, it is possible to simplify a pipe arrangement structure for connecting the radiator and the reserve tank.

Preferably, the reserve tank may be attached to the swing arm.

In accordance with this structure, since it is possible to make the relative position of the reserve tank and the rope-like body constant, it is not necessary to take into consideration a vertical movement of the rope-like body in accordance with a vertical oscillation of the swing arm, so that it is possible to further increase the capacity of the reserve tank by widely using the inner peripheral side space of the rope-like body.

Preferably, the wrapping transmission mechanism may be constituted by a belt transmission mechanism.

In accordance with this structure, in the case that the belt transmission mechanism is used as the wrapping transmission mechanism, it is possible to enlarge a diameter of a pulley winding the belt therearound so as to widen the space in the inner peripheral side of the belt, in comparison with the case of using a chain transmission mechanism, so that it is possible to further increase the capacity of the reserve tank.

Preferably, a side surface of the reserve tank may be positioned at an outer side from a side surface of the rope-like body in a lateral direction, and is covered by an attachable and detachable cover.

Preferably, a display portion for indicating an upper limit and a lower limit of the cooling water may be provided on the side surface of the reserve tank.

BRIEF DESCRIPTION OF THE DRAWINGS

This and other objects and features of the present invention will become more clear from the following description taken in conjunction with a preferred embodiment thereof with reference to the accompanying drawings.

DETAILED DESCRIPTION OF THE PREFERRED EMBODIMENTS

First Embodiment

Figure 1:
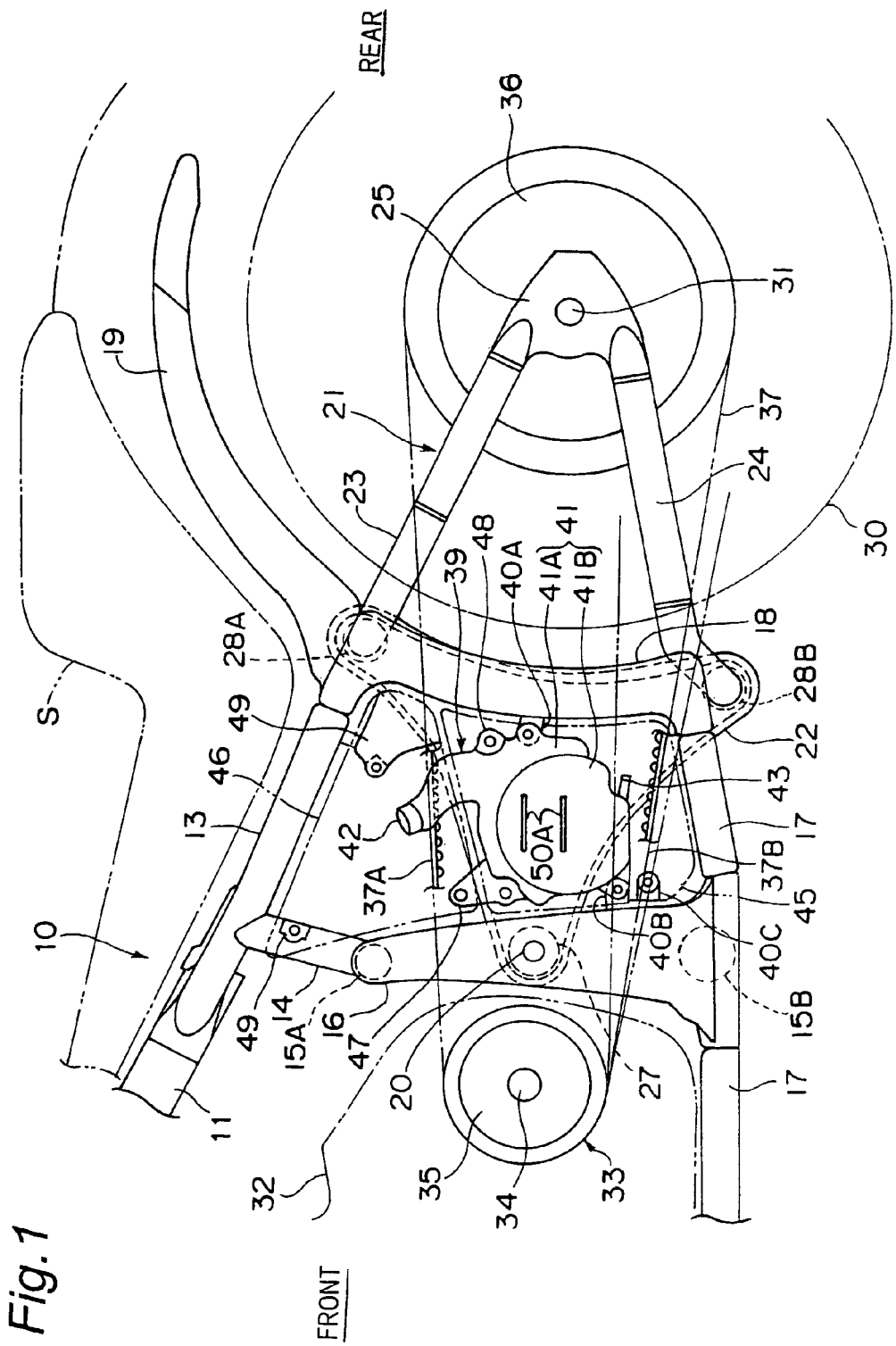
FIG. 1 is a left side elevational view showing a main portion of a rear portion of a vehicle body frame in a motorcycle in accordance with a first embodiment of the present invention.
Figure 2:
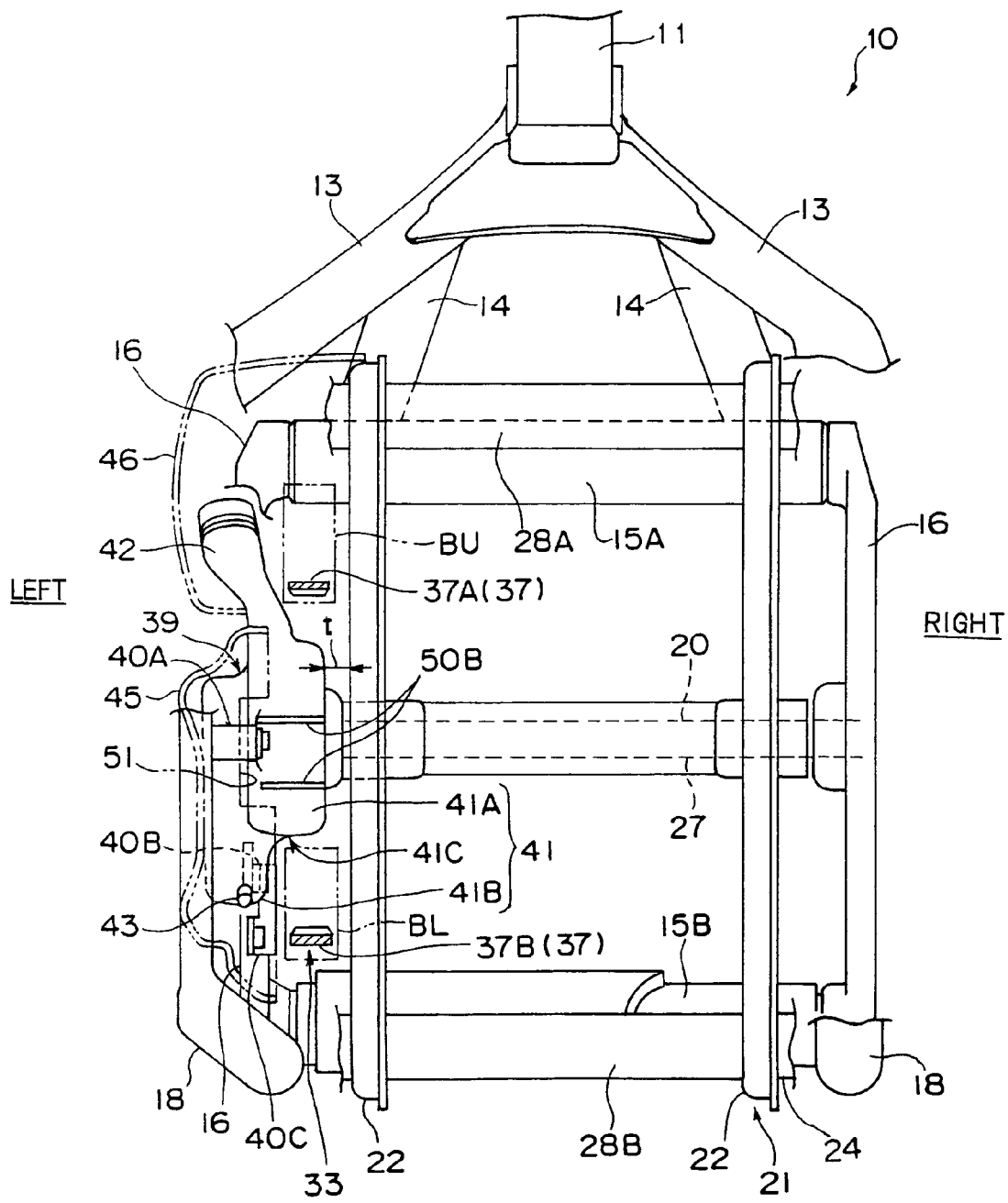
FIG. 2 is a schematic view showing a layout of parts in the case of viewing the vehicle body frame from a back side, in the first embodiment.

FIG. 1 is a left side elevational view showing a main portion of a rear portion of a motorcycle in accordance with a first embodiment of the present invention, and FIG. 2 is a schematic view showing a layout of parts in the case of viewing the vehicle body frame from behind. The motorcycle in accordance with the present embodiment is of a cruiser type, and a vehicle body frame 10 of the motorcycle has an upper frame 11, side frames 13, coupling members 14, upper and lower cross members 15A and 15B, swing arm brackets 16, lower frames 17, vertical frames 18, and rear frames 19.

As shown in FIGS. 1 and 2, the upper frame 11 is structured by one element, and extends in an obliquely rearwardly downward direction in an upper portion of the vehicle body frame 10 from a head pipe (not shown). The side frames 13 are provided as a pair of right and left side frames, and extend in an obliquely rearwardly downward direction while being expanded to right and left outer sides from a rear end portion of the upper frame 11. The coupling members 14 are provided as a pair of right and left coupling members, and extend in obliquely outwardly downward directions from middle portions in a longitudinal direction of the right and left side frames 13. The upper cross member 15A extends in a lateral direction of the motorcycle and is connected to lower end portions of the right and left coupling members 14. The swing arm brackets 16 are provided as a pair of right and left swing arm brackets, and extend to lower sides from respective end portions of the upper cross members 15A. The lower cross member 15B is built in lower end portions of the right and left swing arm brackets 16. The lower frames 17 are provided as a pair of right and left lower frames, extend in a longitudinal direction in the lower portion of the vehicle body frame 10, and are connected to lower end portions of the respective right and left swing arm brackets 16. The vertical frames 18 are provided as a pair of right and left vertical frames, and respectively couple rear end portions of the right and left lower frames 17 extending rearwardly from the swing arm bracket 16 to rear end portions of the right and left side frames 13 in a vertical direction. The rear frames 19 are provided as a pair of right and left rear frames, and extend in an obliquely rearwardly upward direction from upper portions of the respective right and left vertical frames 18. In this case, although an illustration is omitted, a front portion of the lower frame 17 is elongated in an obliquely forward direction so as to be connected to the upper frame 11 or the head pipe. Further, a seat S of the motorcycle shown by a two-dot chain line is arranged in upper portions of the side frames 13 and the rear frames 19.

A swing arm 21 is supported on the swing arm brackets 16 so as to freely oscillate (swing) up and down around a pivot shaft 20 as a supporting point. The swing arm 21 is provided with a pair of right and left plate-like main members 22, a pair of right and left upper members 23, a pair of right and left lower members 24 and a pair of right and left coupling members 25.

Each of the right and left main members 22 is formed approximately in a triangular shape in the side view, and is structured such that one apex portion of the triangle is arranged at a front end portion, and the other two apexes of the triangle are arranged at a rear end portion. A pivot tube 27 is built in the apex portions in the front end portions of the right and left main members 22, and the pivot shaft 20 is inserted in the pivot tube 27. Cross members 28A and 28B are respectively built in upper and lower apex portions in the rear end portions of the right and left main members 22.

As shown in FIG. 1, each of the right and left upper members 23 extends in the obliquely rearwardly downward direction from the apex portion at the rear upper side of the main member 22. Each of the right and left lower members 24 extends in the obliquely rearwardly upward direction from the apex portion at the rear lower side of the main member 22. The coupling member 25 couples the rear end portion of the upper member 23 and the rear end portion of the lower member 24 to each other, and rotatably supports a rear axle 31 of a rear wheel 30 (shown by the two-dot chain line).

An engine 32 shown by a two-dot chain line in FIG. 1 is arranged in a front side of the swing arm bracket 16 between the upper frame 11 and the lower frame 17. A power of the engine 32 is transmitted to the rear axle 31 of the rear wheel 30 via a wrapping transmission mechanism 33. The wrapping transmission mechanism 33 in accordance with the present embodiment corresponds to a belt transmission mechanism, and is constituted by a drive pulley 35 attached to an output shaft 34 of the engine 32, a driven pulley 36 attached to the rear axle 31 of the rear wheel 30, and an endless transmission belt (a rope-like body) 37 (shown by a two-dot chain line and partly by a solid line) wound around the drive pulley 35 and the driven pulley 36. A toothed belt is used as the transmission belt 37, and toothed pulleys are used as the drive pulley 35 and the driven pulley 36. As shown in FIG. 2, the wrapping transmission mechanism 33 is arranged at a left side portion of the motorcycle.

As shown in FIG. 1, a radiator apparatus (not shown) is provided in a front side of the engine 32. A reserve tank 39 for storing cooling water for cooling the engine 32 is connected to the radiator apparatus via piping. The reserve tank 39 is arranged between the side frame 13 and the lower frame 17, and between the swing arm bracket 16 and the vertical frame 18 as seen from the side. Further, as shown in FIG. 2, the reserve tank 39 is arranged on a left side of the left main member 22 of the swing arm 21.

As shown in FIG. 1, mounting brackets 40A and 40B are provided in the vertical frame 18 and the swing arm bracket 16. The reserve tank 39 is attached to the mounting brackets 40A and 40B via bolts or the like.

The reserve tank 39 is formed by a synthetic resin, and is provided with a main body portion 41, a water supply inlet portion 42 protruding upwardly from an upper surface of the main body portion 41, and a water outlet portion 43 protruding rearwardly from a lower portion of the main body portion 41. As shown in FIG. 2, the main body portion 41 of the reserve tank 39 is arranged in such a manner that a right side portion 41A of the reserve tank 39 is set in a space between an upper portion (upper run) 37A and a lower portion (lower run) 37B of the transmission belt 37. A gap t is formed between the reserve tank 39 and the main member 22 of the swing arm 21. The water supply inlet portion 42 extends upward while being displaced slightly outwardly (leftwardly) in the lateral direction from the main body portion 41.

A range shown by reference symbol BU in FIG. 2 corresponds to a range in which the upper portion 37A of the transmission belt 37 moves at a position where the reserve tank 39 is arranged, in accordance with a vertical oscillation of the swing arm 21, and a range shown by reference symbol BL corresponds to a range in which the lower portion 37B of the transmission belt 37 moves at the position where the reserve tank 39 is arranged. In this case, as a matter of convenience, the transmission belt 37 is shown by a cross section. The right side portion 41A of the reserve tank 39 is arranged, in such a manner that it does not overlap the ranges BU and BL, between the bottom of the range BU and the top of the range BL.

A lower surface of the right side portion 41A of the reserve tank 39 set in the space between the upper and lower sides of the transmission belt 37 is arranged in such a manner as to cover the upper side of the lower portion 37B of the transmission belt 37. Further, the left side portion 41B of the reserve tank 39 arranged outwardly (leftwardly) of the transmission belt 37 in the lateral direction bulges further downward than the right side portion 41A. Accordingly, a step portion (a concave portion) 41C is formed between the right side portion 41A and the left side portion 41B, at the lower surface of the reserve tank 39.

As shown in FIG. 1, covers 45 and 46 shown by two-dot chain lines are installed in a space surrounded by the side frame 13, the lower frame 17, the swing arm bracket 16 and the vertical frame 18. The covers 45 and 46 are constituted by a lower cover 45 mainly covering the main body portion 41 of the reserve tank 39, and an upper cover 46 covering space above that covered by the lower cover 45 in a range including the water supply inlet portion 42 of the reserve tank 39. The lower cover 45 is fixed to mounting pieces 47 and 48 protruded from the reserve tank 39, and a mounting bracket 40C provided in the swing arm bracket 16 by bolts or the like. The upper cover 46 is fixed to a mounting piece 47 protruded from the reserve tank 39, and a mounting device 49 provided in the vertical frame 18 and the coupling member 14 by bolts.

As shown in FIG. 1, a display portion 50A indicating an upper limit and a lower limit of the cooling water is provided in a left side surface of the main body portion 41 of the reserve tank 39, and the display portion 50A is exposed to an outer side by detaching the lower cover 45. As shown in FIG. 2, a similar display portion 50B is provided in a rear surface of the main body portion 41 of the reservoir tank 39. A notch 51 is formed in a rear surface of the lower cover 45 in such a manner as to expose the display portion 50B therefrom.

(Operation and Effect of First Embodiment)

As shown in FIG. 2, since the right side portion 41A of the reserve tank 39 is arranged in the space between the upper portion 37A and lower portion 37B (the inner peripheral side) of the transmission belt 37, and the left side portion 41B is arranged outwardly of the transmission belt 37 so as to bulge downwardly from the right side portion 41A, the reserve tank can have a large capacity.

Since the belt transmission mechanism is used as the wrapping transmission mechanism 33, it is possible to make the diameters of the drive pulley 35 and the driven pulley 36 large, it is possible to form the interval between the upper portion 37A and the lower portion 37B of the transmission belt 37 wide, and it is possible to easily increase the capacity of the reserve tank 39.

As shown in FIG. 2, since the reserve tank 39 is arranged in such a manner as to cover the upper side of the lower portion 37B of the transmission belt 37, the reserve tank 39 functions as a cover of the transmission belt 37, whereby it is possible to prevent soil, mud or the like from biting into the transmission belt 37.

As shown in FIG. 2, since the reserve tank 39 is arranged outwardly of the swing arm 21 in the lateral direction, it is possible to easily check out the remaining amount of the cooling water in the reserve tank 39 from the external portion. Particularly, since the display portion 50B is provided at the rear surface of the main body portion 41 of the reserve tank 39, and the notch 51 exposing the display portion 50B therefrom is formed at the rear surface of the lower cover 45, it is possible to easily check out the display portion 50B from the rear side even if the lower cover 45 is kept attached. In this case, if the display portion 50B can be checked out from the rear side, the notch 51 is not necessarily formed in the lower cover 45.

Since the water supply inlet portion 42 of the reserve tank 39 extends upwardly while being displaced outwardly in the lateral direction from the main body portion 41, it is possible to easily supply the water from the water supply inlet portion 42.

Second Embodiment

Figure 3:
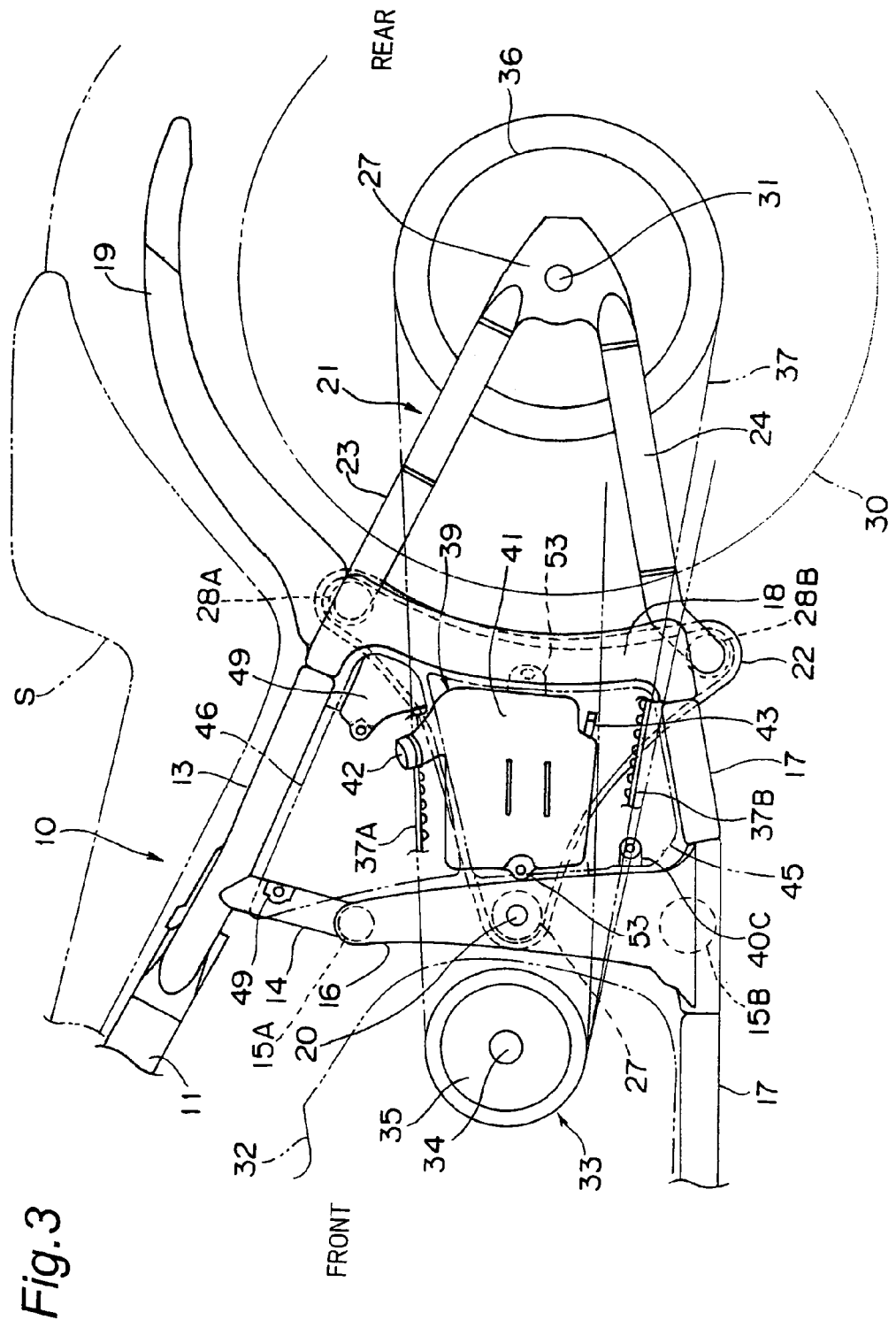
FIG. 3 is a left side elevational view showing a main portion of a rear portion of a vehicle body frame, in a motorcycle in accordance with a second embodiment of the present invention.
Figure 4:
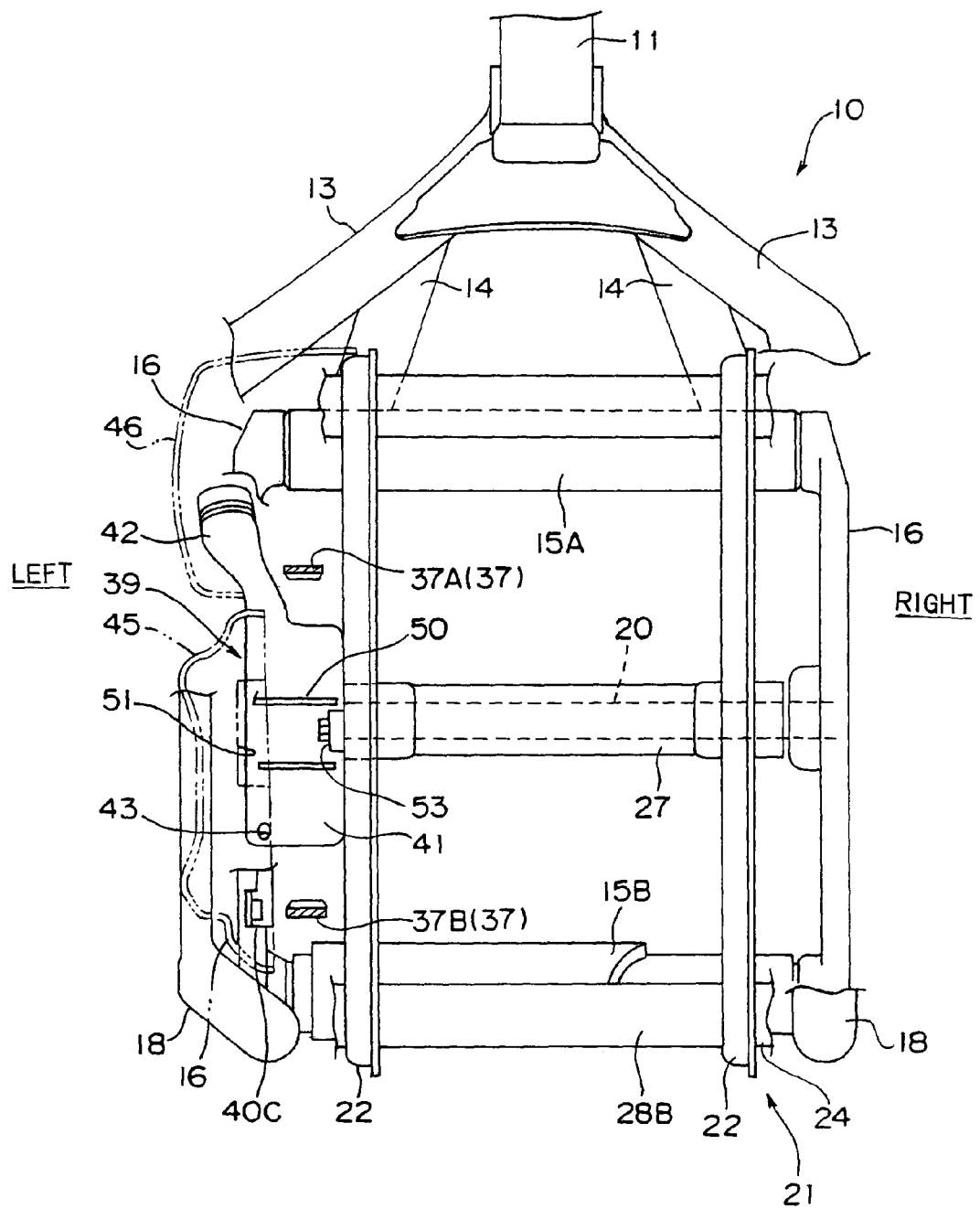
FIG. 4 is a schematic view showing a layout of parts in the case of viewing the vehicle body frame from a back side, in the second embodiment.

FIG. 3 is a left side elevational view showing a main portion of a rear portion of a vehicle body frame, in a motorcycle in accordance with a second embodiment of the present invention, and FIG. 4 is a schematic view showing a layout of parts in the case of viewing the vehicle body frame from a back side, in the second embodiment. The present embodiment is different from the first embodiment in a point that the reserve tank 39 is attached to the swing arm 21. Since the other structures are the same as the first embodiment, a detailed description thereof will be omitted by attaching the same reference numerals.

Specifically, the reserve tank 39 is integrally provided with mounting pieces 53 protruding rearwardly and forwardly, and the mounting pieces 53 are attached to the main member 22 of the swing arm 21 by bolts or the like. As shown in FIG. 4, the main body portion 41 of the reserve tank 39 is arranged between the upper portion 37A and the lower portion 37B of the transmission belt 37 as seen from behind. The lower surface of the reserve tank 39 covers the lower portion 37B of the transmission belt 37 from the upper side, and is not provided with the concave (step) portion 41C (FIG. 2) such as the first embodiment but is formed as a flat surface.

In the present embodiment, since the reserve tank 39 is attached to the swing arm 21, the relative positions of the reserve tank 39 and the transmission belt 37 are fixed. Accordingly, without taking into consideration the movement of the transmission belt 37 in accordance with the up and down oscillation of the swing arm 21 such as in the first embodiment, the capacity of the reserve tank 39 can be increased by widely using the inner peripheral side space of the transmission belt 37. In particular, it is possible to enlarge the vertical height of the reserve tank 39 in such a manner that the reserve tank 39 comes close to the upper portion 37A and the lower portion 37B of the transmission belt 37.

Further, since it is not necessary to form the gap t (FIG. 2) between the reserve tank 39 and the swing arm 21 (as is the case in the first embodiment), and the reserve tank 39 can be brought into contact with or close to the swing arm 21, it is possible to enlarge the width in the lateral direction of the reserve tank 39.

Other Embodiments

The wrapping transmission mechanism 33 may be constituted by a chain transmission mechanism formed by winding an endless chain (a rope-like body) around a drive sprocket and a driven sprocket.

The reserve tank 39 is structured such that the right side portion 41A thereof is arranged in the inner peripheral side of the transmission belt 37, and the left side portion 41B is arranged outwardly of the transmission belt 37. However, the reserve tank 39 may be structured inversely.

An entirety of the reserve tank 39 or an entirety of the main body portion 41 may be arranged so as to be located in the inner peripheral side of the transmission belt 37.

Although the invention has been described in its preferred embodiments with a certain degree of particularity, obviously many changes and variations are possible therein. It is therefore to be understood that the present invention may be practical otherwise than as specifically described herein without departing from the scope and spirit thereof.

What is claimed is:

1. A reserve tank layout structure of a motorcycle, comprising:
    a vehicle body frame;
    an engine supported by the vehicle body frame;
    a swing arm attached to the vehicle body frame so as to freely oscillate in a vertical direction;
    a rear wheel supported by the swing arm;
    a wrapping transmission mechanism having an endless transmission element wound between an output shaft of the engine and an axle of the rear wheel and transmitting power from the output shaft to the axle; and a reserve tank for storing cooling water of the engine, wherein the reserve tank is disposed so that at least a part thereof is positioned at an inner peripheral side of the endless transmission element.

2. The reserve tank layout structure of the motorcycle, as claimed in claim 1, wherein the reserve tank is attached to the vehicle body frame.

3. The reserve tank layout structure of the motorcycle, as claimed in claim 1, wherein the reserve tank is attached to the swing arm.

4. The reserve tank layout structure of the motorcycle, as claimed in claim 1, wherein the wrapping transmission mechanism is constituted by a belt transmission mechanism.

5. The reserve tank layout structure of the motorcycle, as claimed in claim 1, wherein a side surface of the reserve tank is positioned at an outer side from a side surface of the endless transmission element in a lateral direction, and is covered by an attachable and detachable cover.

6. The reserve tank layout structure of the motorcycle, as claimed in claim 5, wherein a display portion for indicating an upper limit and a lower limit of the cooling water is provided on the side surface of the reserve tank.

7. The reserve tank layout structure of the motorcycle, as claimed in claim 1, wherein the endless transmission element is trained about the output shaft of the engine and the axle of the rear wheel so as to have an upper run portion and a lower run portion with a space therebetween; and said at least part of the reserve tank is disposed in said space between said upper run and said lower run of said endless transmission element.

8. The reserve tank layout structure of the motorcycle, as claimed in claim 1, wherein said reserve tank has, at an upper portion thereof, a cooling water inlet and, at a lower portion thereof, a cooling water outlet.

9. The reserve tank layout structure of the motorcycle, as claimed in claim 1, wherein said engine includes a radiator, and said reserve tank is fluidically connected to said radiator.

10. A reserve tank layout structure of a motorcycle, comprising:

a vehicle body frame;

an engine mounted to said vehicle body frame and having an engine output shaft;

a swing arm swingably mounted to said vehicle body frame to swing in a vertical direction;

a rear wheel mounted to said swing arm and having a rear wheel axle;

an endless transmission element trained about said engine output shaft and said rear wheel axle so as to have an upper run and a lower run with a space therebetween; and an engine cooling water reserve tank for storing engine cooling water, said engine cooling water reserve tank being fluidically connected with said engine;

wherein at least a part of said reserve tank is positioned in said space between said upper run and said lower run of said endless transmission element.

11. The reserve tank layout structure of the motorcycle, as claimed in claim 10, wherein said reserve tank is attached to said vehicle body frame.

12. The reserve tank layout structure of the motorcycle, as claimed in claim 10, wherein said reserve tank is attached to said swing arm.

13. The reserve tank layout structure of the motorcycle, as claimed in claim 10, wherein said endless transmission element is constituted by an endless belt.

14. The reserve tank layout structure of the motorcycle, as claimed in claim 10, wherein a side surface of said reserve tank is positioned laterally outwardly of said space between said upper run and said lower run of said endless transmission element, and said side surface is covered by a detachable cover.

15. The reserve tank layout structure of the motorcycle, as claimed in claim 14, wherein said side surface of said reserve tank has a display portion indicating an upper cooling water limit and a lower cooling water limit.

16. The reserve tank layout structure of the motorcycle, as claimed in claim 15, wherein said display portion is arranged to be exposed from said detachable cover to be viewed from a rear side of the motorcycle.

17. The reserve tank layout structure of the motorcycle, as claimed in claim 16, wherein a notch portion is formed in said detachable cover to expose said display portion to be viewed from the rear side of the motorcycle.

18. The reserve tank layout structure of the motorcycle, as claimed in claim 10, wherein said reserve tank has, at an upper portion thereof, a cooling water inlet and, at a lower portion thereof, a cooling water outlet.

19. The reserve tank layout structure of the motorcycle, as claimed in claim 10, wherein said engine includes a radiator, and said reserve tank is fluidically connected to said radiator.

* * * * *